United States Patent [19]
Bird et al.

[11] Patent Number: 5,148,479
[45] Date of Patent: Sep. 15, 1992

[54] AUTHENTICATION PROTOCOLS IN COMMUNICATION NETWORKS

[75] Inventors: Raymond F. Bird, Durham, N.C.; Inder S. Gopal, Fort Lee, N.J.; Philippe A. Janson, Waedenswil, Switzerland; Shay Kutten, Rockaway, N.J.; Refik A. Molva, Zurich, Switzerland; Marcel M. Yung, New York, N.Y.

[73] Assignee: International Business Machines Corp., Armonk, N.Y.

[21] Appl. No.: 672,226

[22] Filed: Mar. 20, 1991

[51] Int. Cl.$^5$ .................. H04K 1/00; H04K 9/00
[52] U.S. Cl. .................. 380/23; 380/24; 380/25; 380/48
[58] Field of Search ............ 380/23, 24, 25, 48

[56] References Cited

U.S. PATENT DOCUMENTS

| | | |
|---|---|---|
| 4,193,131 | 3/1980 | Lennon et al. |
| 4,218,738 | 8/1980 | Matyas et al. .................. 364/200 |
| 4,386,233 | 5/1983 | Smid et al. |
| 4,549,075 | 10/1985 | Saada et al. .................. 340/825.34 |
| 4,649,233 | 3/1987 | Bass et al. .................. 380/21 |
| 4,890,323 | 12/1989 | Beker et al. .................. 380/25 |
| 4,919,545 | 4/1990 | Yu .................. 380/25 |
| 4,926,480 | 5/1990 | Chaum .................. 380/23 |

FOREIGN PATENT DOCUMENTS 8908957 9/1989 PCT Int'l Appl.

OTHER PUBLICATIONS

R. M. Needham et al, "Using Encryption for Authentication in Large Networks of Computers", CACM, vol. 21, No. 12, Dec. 1978.
R. M. Needham et al, "Authentication Revisited", Operating Systems Review, vol. 21, No. 1, Jan. 1987.
"Banking-Key Management (Wholesale)", Int'l Organization for Standardization, 1987.
D. Otway et al, "Efficient and Timely Mutual Authentication", The ANSA Project, U.K.
Steiner et al, "Kerberos: An Authentication Service for Open Network Systems", Proj. Athena, M.I.T., Mar. 1988.
M. Burrows et al, "A Logic of Authentication", Feb. 1989, Digital, Systems Research Center.

Primary Examiner—Stephen C. Buczinski
Attorney, Agent, or Firm—Jerry W. Herndon

[57] ABSTRACT

An arrangement of authenticating communications network users and means for carrying out the arrangement. A first challenge N1 is transmitted from a first user A to a second user B. In response to the first challenge, B transmits a first response and second challenge N2 to A. A verifies the first response. A then generates and transmits a second response to the second challenge to B, where the second response is verified. The first response must be of a minimum form $$f(S1, N1, \ldots),$$

and the second response must be of the minimum form $$g(S2, N2, \ldots).$$

S1 and S2 are shared secrets between A and B. f() and g() are selected such that the equation $$f(s1, N1', \ldots) = g(S2, N2)$$

cannot be solved for N1' without knowledge of S1 and S2. f() and N1' represent expressions on a second reference connection. Preferably, the function f() may include the direction D1 of the flow of the message containing f(), as in f(s1, N1, D1, ...). In such a case, f() is selected such that the equation $$f(S, N1', D1', \ldots) = f(S, N2, D1, \ldots)$$

cannot be solved for N1' without knowledge of S1 and S2 and D1' is the flow direction indicator of the message containing f'() on the reference connection.

28 Claims, 11 Drawing Sheets

CONDITION 1:
IF X CANNOT CHOOSE N1' SUCH THAT f'( ) = g( ), THE PROTOCOL IS SECURE AGAINST INITIATING ATTACK.

WHERE $$q = q(N1,...)$$
$$r = r(D,...)$$
$$t = t(N2,...)$$

OR $$q = q(D,...)$$
$$r = r(N1,...)$$
$$t = t(N2,...)$$

AND

CONDITIONS C1 AND C2 ARE MET.

AUTHENTICATION PROTOCOLS IN COMMUNICATION NETWORKS

TECHNICAL FIELD

The invention generally relates to methods for maintaining security against unauthorized network users or other network entities, such as a program. In particular, it relates to methods for authenticating that a user attempting to establish communications with another network user or node is, in fact, the user that it represents itself to be.

BACKGROUND OF THE INVENTION

Authentication of users in a network allows a pair of users who wish to communicate to prove their identities to each other. There are many variations of authentication protocols that are discussed in the literature. Some require the use of a shared secret, such as a secret digital key or a secret mathematical function, that is applied to a suitable parameter or parameters; others use public-key types of protocols. This invention is concerned primarily with authentication protocols using shared secrets, although it can be easily adapted for use in public-key systems.

With respect to the prior art, U.S. Pat. No. 4,890,323, "Data Communication Systems and Methods", issued on Dec. 26, 1989 to Beker, describes a file and sender authentication method in which an encrypted check-sum is computed on the contents of a message using a first private key. This check-sum is issued as a "challenge" to a user who computes a result using a second private key. The result is appended to the response as an authentication code before return transmission. A recipient of the response equipped with the same first and second crytographic keys can therefore check both the contents of the message and the identity of the sender by computing an expected authentication code from the received response and comparing it with the code received.

U.S. Pat. No. 4,919,545, "Distributed Security Procedure for Intelligent Networks", which issued on Apr. 24, 1990 to C. Yu, discloses a file authentication method. An execution node transmits a capability and a signature to an invocation node. The capability includes an identifier of and access rights to a file. The signature is formed at the execution node by encryption of the capability with a key that is unique to the invocation node and is stored only in the execution node. A request for access to the file is transmitted with the capability and the signature from the invocation node to the execution node. At the execution node, the request is authenticated by encryption of the capability with the encryption key that is associated with the invocation node. Access to the file is authorized only when the signature generated by the execution node matches the signature received from the invocation node.

U.S. Pat. No. 4,193,131, entitled "Crytographic Verification of Operational Keys Used in Communication Networks", issued on Mar. 11, 1980 to R. Lennon et. al. This patent discloses an encryption key distribution and user authentication method using a shared private key. A first station encrypts a first verification number using the key to provide first station ciphertext for transmission to the second station. At the second station, the first station ciphertext is further encrypted using the key to provide second station ciphertext for transmission back to the first station. The first station reencrypts the first verification cipertext and compares it the received second station ciphertext to verify that the second station is the source of the second station ciphertext. This authentication is possible only if the operational keys of the two stations are identical.

U.S. Pat. No. 4,386,233, "Cryptographic Key Notarization Methods and Apparatus", issued on May 31, 1983 to M. E. Smid et. al., also discloses a key distribution system and user authentication method in which cryptographic keys are notarized by encrypting the keys using a notarizing key derived from identifiers associated with the users in question and an interchange key accessible only to authorized users of the cryptographic function. The identity of a user of the cryptographic function is authenticated as a condition to access to an interchange key. This authentication is accomplished by comparing a password designation supplied by the user with a prestored version of the password which has been notarized by having been encrypted with the cryptographic function using a notarizing cryptographic key derived from the identifier of the corresponding authorized user and an interchange key.

U.S. Pat. No. 4,218,738, "Method for Authenticating the Identity of a User of an Information System", issued to S. M. Matyas et. al. on Aug. 19, 1980 discloses yet another method of attempting to authenticate users in a network. A user verification number is a function of the user's identity, a separately entered password associated with the user, and a stored test pattern. The test pattern for a user is generated under physical security of a central computer using a variation of a host computer master key.

U.S. Pat. No. 4,549,075, "Method of Certifying the Origin of at Least One Item of Information Stored in the Memory of a First Electronic Device and Transmitted to a Second Electronic Device, and System for Carrying Out the Method", issued to Charles Saada Oct. 22, 1985. This patent discloses a shared secret type of authentication protocol, which is said to overcome certain problems in the prior art authentication method summarized therein. In this prior art method, a user B authenticates a user A. Both A and B share an item of information I, a secret S and a function $f( )$. To begin an authentication, A sends I to B. B responds with a random number, a nonce, Nb. Both A and B compute $f(I,Nb,S)$. A sends its computed response to B and B compares this response with its calculation. It is said that A can authenticate B in a similar manner. Saada does not point out that this prior art protocol can be easily broken in a general network environment. Rather, Saada attempts to solve the problem posed by the prior art method when A and B do not share an item of information I, but rather have their own individual items of information Ia and Ib. Saada applies the summarized prior art method to this new scenario and concludes that resulting protocol can easily be broken.

Thus, Saada's invention is to allow the users to authenticate each other when each has different information units Ia and Ib. Again, A and B share a function $f( )$ and a secret S. A has an item of information Ia; B has an item of information Ib. A sends Ia and a nonce Na to B. B returns item Ib and another nonce Nb to A. A calculates $R1=f(Na,S,p(Ia,Ib))$ and $K1=f(Nb,S,p(Ia,Ib))$ and sends K1 to B. $p( )$ is a symmetric function known both to A and B. The symmetry means that $p(Ia,Ib)=p(Ib,Ia)$. B calculates $K2=f(Na,S,p(Ib,Ia))$ and $R2=f(Nb,S,p(Ib,Ia))$ and sends K2 to A. A compares K2 with its result R1 to authenticate B and B compares K1 with its result R2 to authenticate A. It is said that this protocol insures that A and B are part of the same group, because of the secret S, and that A and B are who they say they are, because the items Ia and Ib are authenticated one-to-the-other via the symmetric function p( ). It is seen that Saada's algorithm requires a minimum of four message flows. It is the fourth flow that prevents this method from being broken by methods that are described briefly below.

In yet another known authentication method, user A first sends to user B a challenge Na in the form of a nonce (message 1). B returns an encrypted value of the nonce using a private shared key to perform the encryption, plus a second nonce Nb in clear text (message 2). A then returns an encrypted value of the second nonce to B (message 3) who verifies that this response was properly encrypted with the shared key. This protocol requires three messages. However, as will be shown, this protocol can also be easily broken.

As seen by the above summarized art, existing authentication methods use various forms of shared secrets and encryption of data by the users, using a shared key, to assure that the users are who they say they are. However, the existing methods suffer from a number of problems. In theory, each user authenticates the other because the proper encryptions and/or decryptions cannot be generated by a user that does not know the shared secret. In practice however, these authentication methods either require too many message flows, or too many encryption or decryption operations, or are subject to a variety of successful attacks.

Using the last mentioned authentication method for example, in a first successful type of attack, an intruder X, pretending to be A, initiates the attack by sending the first challenge Na to B (message 1). B returns the encrypted value of the first challenge E(Na), plus the second challenge Nb (message 2). X, who does not know the secret key, obtains the correct encryption of Nb by initiating another connection (called a reference connection throughout the description) with the real A, or some other user C who knows the key, and transmits Nb as the first challenge of the reference connection. A, or C, returns E(Nb) to X as a response. X then sends E(Nb) to B as the answer to the second challenge of the initial attack connection.

In a second type of attack as another example, X intercepts the first message containing Na from A intended for B. X, pretending to be B, initiates a reference connection with A (or C) and sends Na in message 1 of the reference connection. A (or C) responds with E(Na) and a second nonce Nb. X then terminates the reference connection and sends E(Na) in the second message to A on the attack connection.

There are a number of variations of the above initiate and intercept attacks. In all of these attacks, however, the intruder X, not knowing the secret shared by legitimate users, gleans information from other connections and uses this information to derive the necessary responses to challenges offered by the attacked user. The connections from which the gleaned information is obtained may or may not be with the attacked user. As far as can be determined, all of the known prior art methods that involve only three message flows can be broken, or are inefficient and unnecessarily complex to use or evaluate. Other known methods involving more than three flows may or may not be secure. However, even for the secure methods, the increased number of message flows that are required can place a heavy traffic burden on a network. This additional burden is otherwise unproductive and limits the capacity of the network from the users point of view.

Thus, there exists a clear need to establish an authentication protocol and method that is immune from otherwise successful attacks by intruders that have no knowledge of the authentication secret. Furthermore, it is important in any practical implementation of a protocol that the number of message flows required to carry out the authentication be kept as small as possible, preferably three, at the risk of otherwise overburdening the network.

SUMMARY OF THE INVENTION

One embodiment of the invention involves the method and means of authenticating a user on a communications connection in a network. A first user A transmits a challenge N1 to a second user B. User B returns a response to the challenge to user A, which verifies that the response is correct. The response is of the minimum form $$f(S1, N1, D1 \ldots),$$

wherein S1 is a shared secret between the users, D1 is an indication of the direction of flow of the message containing f( ) and f( ) is a function selected such that $$f(S1, N1', D1', \ldots) = f(S1, N1, D1, \ldots)$$

cannot be solved for N1' without knowledge of S1. f'( ), N1' and D1' represent expressions on a reference connection. A protocol designed in accordance with the above invention is secure against so-called intercept attacks. Intercept attacks are those in which an intruder lies in wait and intercepts a message containing a challenge from a user A. The intruder then initiates a reference connection with another user other than the intended recipient of the intercepted challenge and attempts to glean information on the reference connection to generate the correct response to the intercepted challenge.

A second embodiment of the invention is a method and means of mutually authenticating users. A first challenge N1 is transmitted from a first user A to a second user B. In response to the first challenge, B generates and transmits a first response to the challenge and second challenge N2 to A. A verifies that the first response is correct. A then generates and transmits a second response to the second challenge to B, where the second response is verified. The first response must be of a minimum form $$f(S1, N1, \ldots),$$

and the second response must be of the minimum form $$g(S2, N2, \ldots).$$

S1 and S2 are shared secrets between A and B. In addition, f( ) and g( ) are selected such that the equation $$f(S1, N1', \ldots) = g(S2, N2, \ldots)$$

cannot be solved for N1' without knowledge of S1 and S2. f'( ) and N1' represent expressions on another reference connection which an intruder uses to gain information in an attempt to break the protocol on an attack connection.

A specific authentication protocol designed in accordance with the second embodiment is secure from so-called initiate attacks. Initiate attacks are those in which an intruder first initiates a connection with a user by sending it the first challenge and, after receiving the response and second challenge, the intruder initiates a second reference connection with a user to gain information to aid in its response to the second challenge.

In some protocols that meet the above summarized requirements, the secrets may reside in the specific functions f( ) and g( ) that are used. In other protocols, data encryption can be used, with the secret residing in the specific encryption key or keys that are used.

The two embodiments of the invention may be combined into one protocol. In this event, the function f( ) will include some indication of the direction D1 of flow of the message containing f( ), as in f(S1, N1, D1, ... ). Such protocols that satisfy all of the above conditions of the combined embodiments are as secure from both initiate and intercept types of attacks as is the underlying secret or secret shared by authorized users. It should be noted that S1 can equal S2, if desired. Moreover, the secret or secrets can be of virtually any type whatsoever. Thus, a secret might be the particular key or keys that are used to perform encryption of data. Alternatively, the secrets might be the particular functions f( ) and g( ) that are used between authorized users. Or, the secret might be the particular algorithm or algorithms that are used to encrypt or decrypt data, etc.

DETAILED DESCRIPTION

Figure 1:
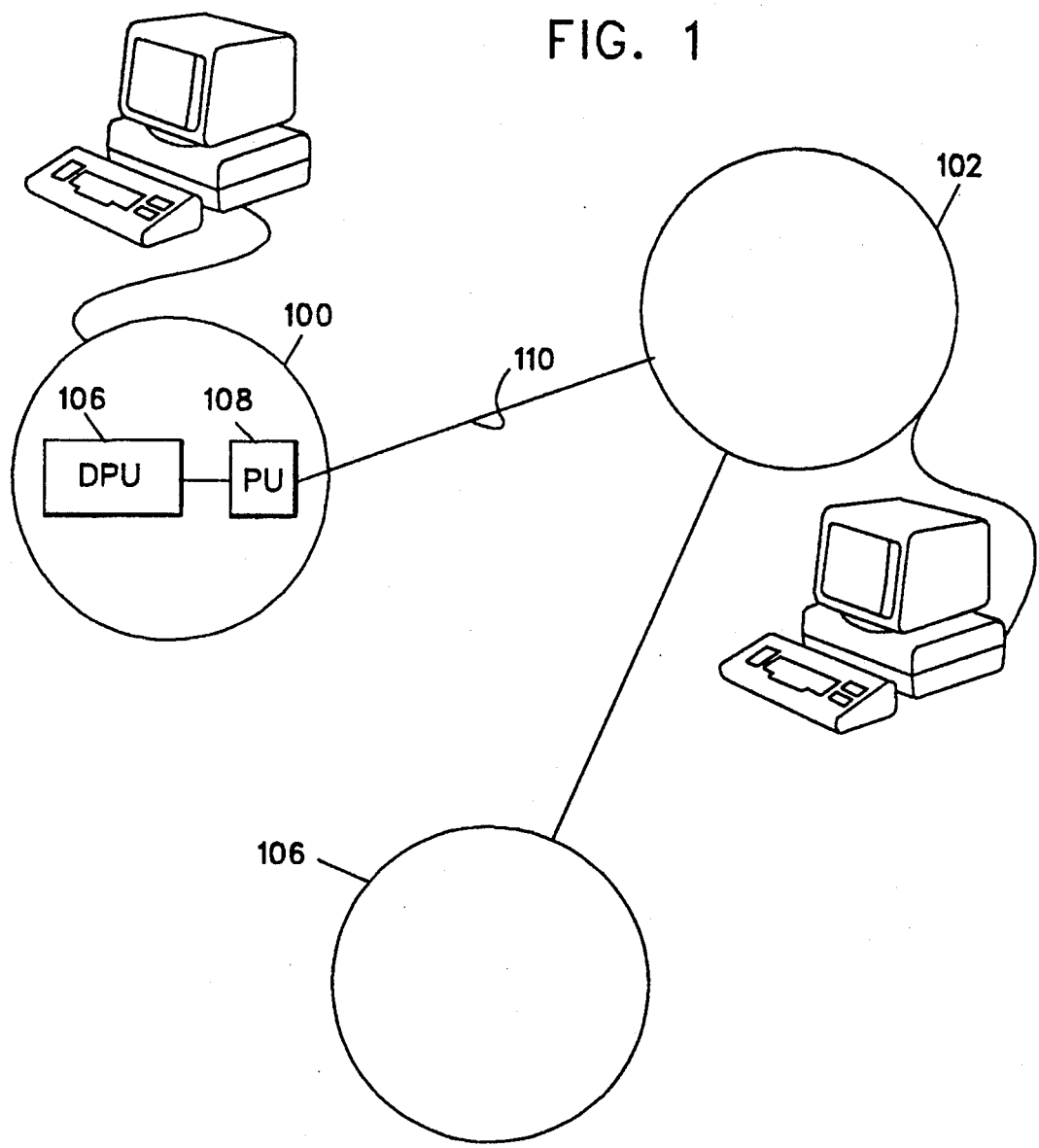
FIG. 1 shows a general layout of an illustrative data communication system in which the invention may be practiced.

FIG. 1 shows a general layout of an illustrative data communication system in which the invention may be practiced. This illustrative system includes a number of data processing users 100, 102 and 104. Each user includes or has access to a computer or data processing unit, such as 106, and appropriate peripheral units 108 for communicating with other users of the system via channels such as 110. A computer at a user may be any type of general or special purpose computer capable of being programmed in accordance with the principles disclosed herein. In the preferred embodiment, such computers include System 370 computers marketed by the IBM Company.

In FIG. 1, if a user 100, wishes to establish a logical connection with another user 102, it is required that both users share knowledge of a secret S, and that the users authenticate each other by means of an appropriate authentication protocol before meaningful communication is allowed over the logical connection.

Figure 2:
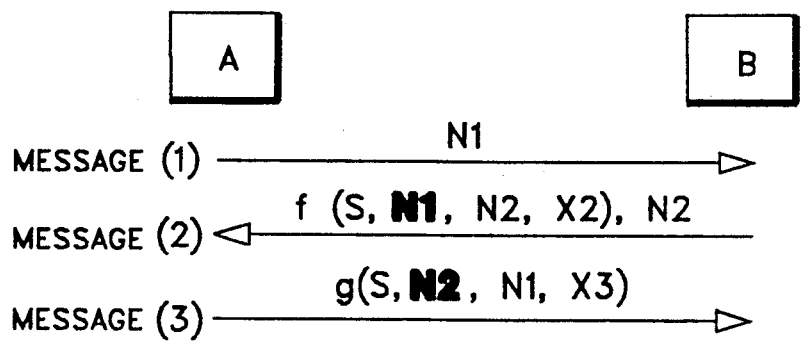
FIG. 2 shows the general form of protocols in accordance with the invention that protect against initiate attacks by intruders.

FIG. 2 shows the general form of a family of protocols that may be secure against attack by an intruder X. A user A initiating a connection sends a message 1 containing a challenge N1 to the user B with which communication is to be established. N1, and all challenges are Preferably random numbers, or nonces. In any event, challenges should be freshly generated so there can be no possibility of use by intruders based on historical events. B returns a message 2 to A of the form $f(S, N1, N2, X2), N2$; where f( ) is a function which is the response to the challenge N1, S represents a secret shared by legitimate users A and B that is required to generate the response and N2 is a challenge from B to A. The variables S and N1 in f( ) are shown in bold in FIG. 2 to indicate that these variables must be present in some form in function f( ). The remaining variables N2 and X2 may or may not be present. X2 is a general variable used here to represent any desired constant or expression that might be included in f( ). For example, X2 might include access information, names, time stamps, etc. It is assumed that nothing contained in X2 is part of the secret S. In other words, it is assumed that an intruder X known X2. User A then returns message 3 containing the response $g(S, N2, N1$ and $X3)$ to the challenge N2. The variables S and N2 in g( ) are similarly shown in bold to indicate that they must be present in some form within function g( ). X3 is similar to X2 in that it represents any desired constant or expression that might be included in g( ). It is assumed that X knows X3. In addition, for the protocol to be secure against attacks in which an intruder X attempts to initiate connections, f( ) must satisfy a first condition that an intruder cannot choose a first challenge N1' on a reference connection such that $f'( ) = g( )$, where $f'( )$ represents f( ) on a reference connection. If this condition is satisfied, then the resulting protocol is as secure from initiating attacks as is the underlying secret S.

Figure 3:
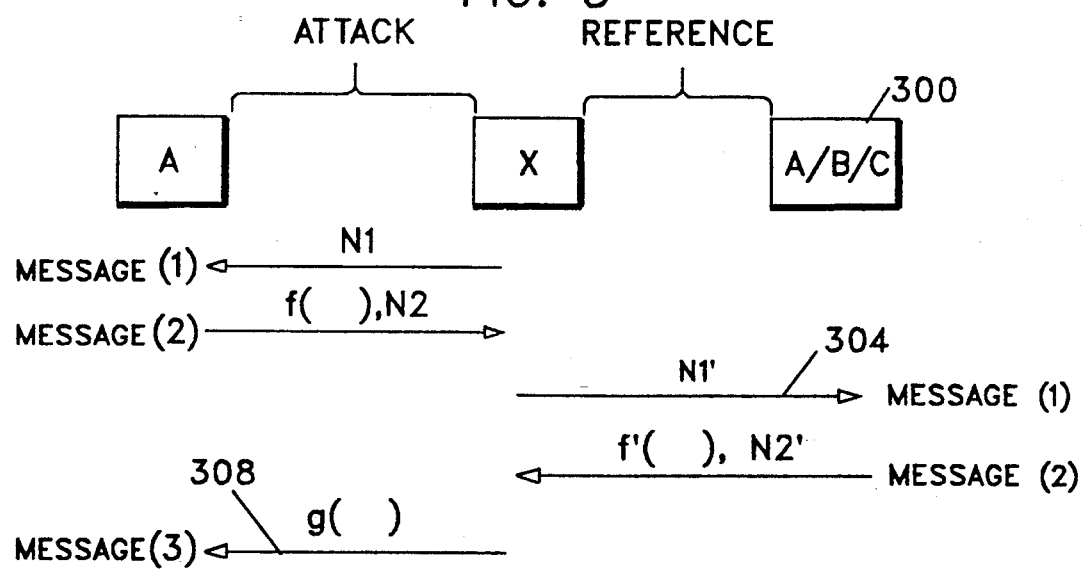
FIG. 3 shows the details of an initiate attack by an intruder.

The meaning of the primed notation (') above will become more apparent with respect to FIG. 3 which shows the use of a reference connection by an intruder to gather information to attack a real connection. In FIG. 3, the intruder X initiates a connection with user A by sending the first challenge N1 in message 1 of the attack connection. A returns its response f( ) to the challenge and a challenge N2 to X at message 2 of the attack connection. X does not know the secret S required to generate the response to N2. In an attempt to get such information, X initiates a reference connection by sending another first challenge N1' to a user at 300. This secondary user may be A or some other user B or C. It doesn't matter as long as the selected other user knows the secret S. User 300 responds to the challenge N1' with the response $$f(\ )=(S, N1', N2', X2').  \quad \text{Eq. 1}$$

X now attempts to manipulate the information received from 300 to generate the response g( ) on message 3 of the attack connection. Thus, a necessary condition to prevent this attack is C1: X cannot choose N1' such that f'( )=g( ).

Figure 4:
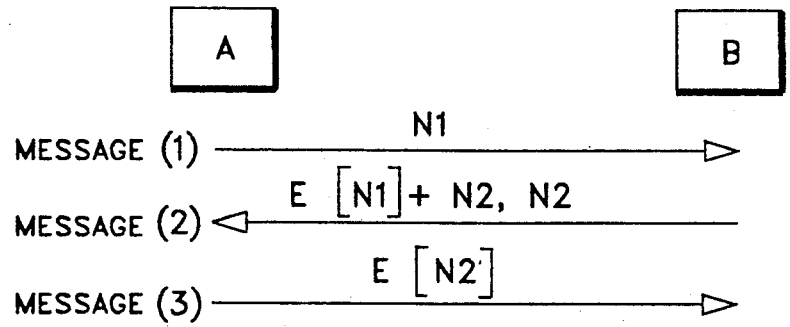
FIGS. 4 and 5 show an example of a protocol that is vulnerable to an initiate attack.

FIG. 4 shows a specific protocol which appears to be secure, but which in fact can be broken easily because it does not satisfy condition C1. The function f( ) in message 2 of FIG. 4 is $$f(\ )=E[N1]+N2, \quad \text{Eq. 2}$$

where E represents encryption with a secret key K. The + operator in the equation, by way of example, is the boolean operation EXCLUSIVE-OR. Thus, f( ) satisfies the requirements that it be a function of N1 and S (S being encryption E with key K). To test the protocol, we mathematically apply condition C1:

Condition C1:

$$f(\ )=g(\ ), \text{ or} \quad \text{Eq. 3}$$

$$E[N1']+N2'=E[N2]. \quad \text{Eq. 4}$$

Figure 5:
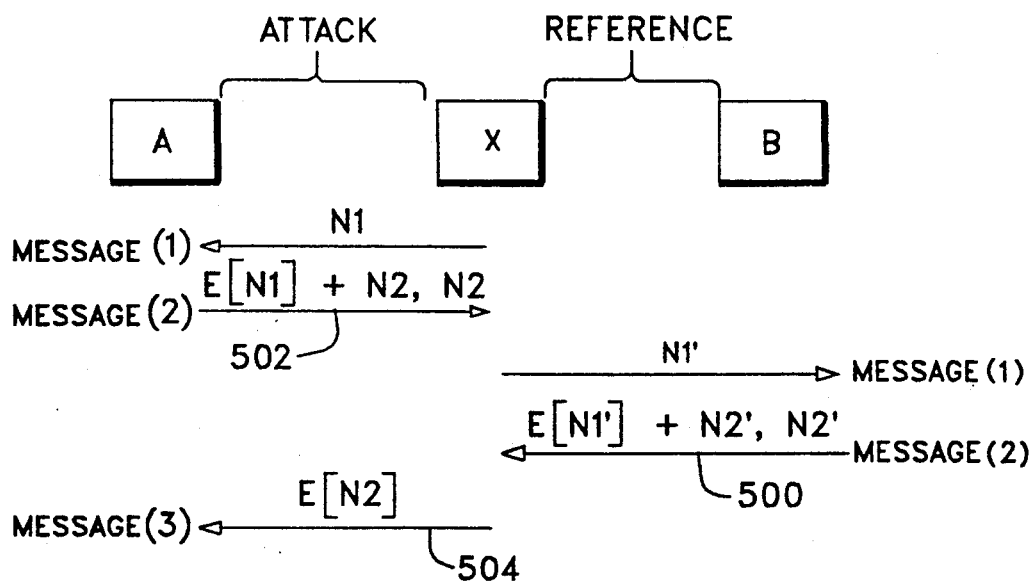

FIG. 5 shows an attack connection and a reference connection that intruder X might use to attempt to break the protocol. Notice that the response in message 2 of the reference connection is $$E[N1']+N2',$$

which is exactly the same format as equation 0 above. Thus, by merely picking N1'=N2, which is known from message 2 of the attack connection, X receives on message 2 of the reference connection $$E[N2]+N2', N2'.$$

N2' is a new challenge on the reference connection and does not equal N2. Nevertheless, X now knows E[N2]+N2'. Since N2' is also known because it is received as the clear text challenge in the same message 2 of the reference connection, X merely derives E[N2] by EXCLUSIVE-ORing N2' with E[N2]+N2', $$E[N2]+N2'+N2'=E[N2] \quad \text{Eq. 5}$$

and returns this value as the response in message 3 of the attack connection.

Figure 6:
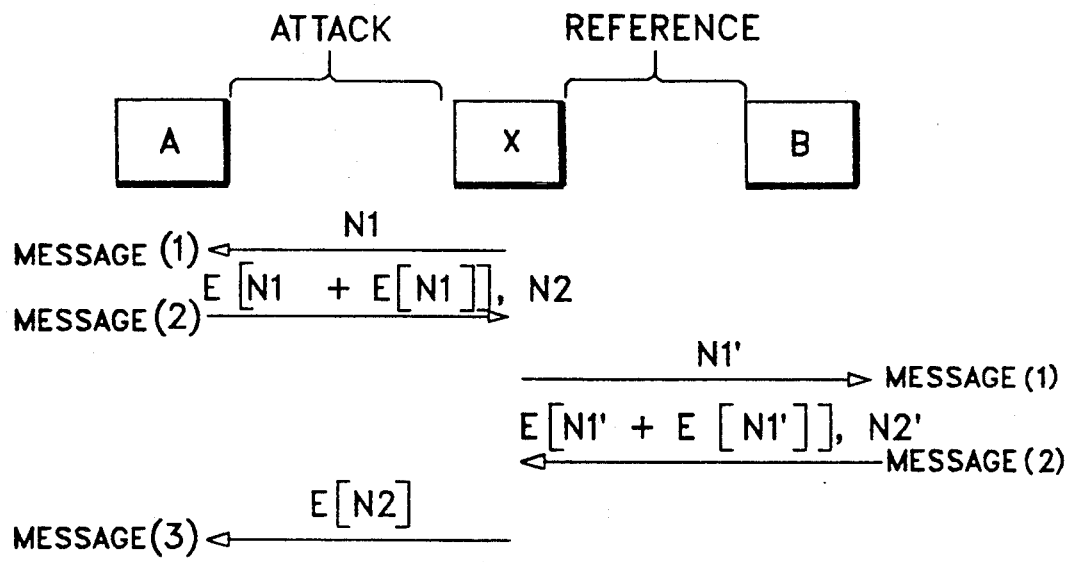
FIG. 6 shows a specific protocol that is secure against initiate, but insecure against intercept attacks.

FIG. 6 shows an illustrative protocol that is secure against initiating attacks. In this protocol, $$f(\ )=E[N1+E[N1]], \text{ and} \quad \text{Eq. 6}$$

$$g(\ )=E[N2]. \quad \text{Eq. 7}$$

f( ) satisfies the conditions that it is a function of the challenge N1 and a secret S and that g( ) is a function of challenge N2 and secret S. Now we test condition C1 to determine if the protocol is really secure against initiate attacks.

Condition C1:

$$f(\ )=g(\ ), \text{ or} \quad \text{Eq. 8}$$

$$E[N1'+E[N1']]=E[N2]. \quad \text{Eq. 9}$$

Inspection of equation 9 reveals that there is no known value of N1' that can be substituted that will result in E[N2], without knowing the encryption key K. Moreover, removing the encryption applied to both sides of the equation yields $$N1'+E[N1']=N2, \text{ or} \quad \text{Eq. 10}$$

$$N1'=E[N1']+N2. \quad \text{Eq. 11}$$

Since X does not know E, there is no way that X can derive N1'. Therefore, this particular protocol is secure against initiate attacks.

Figure 7:
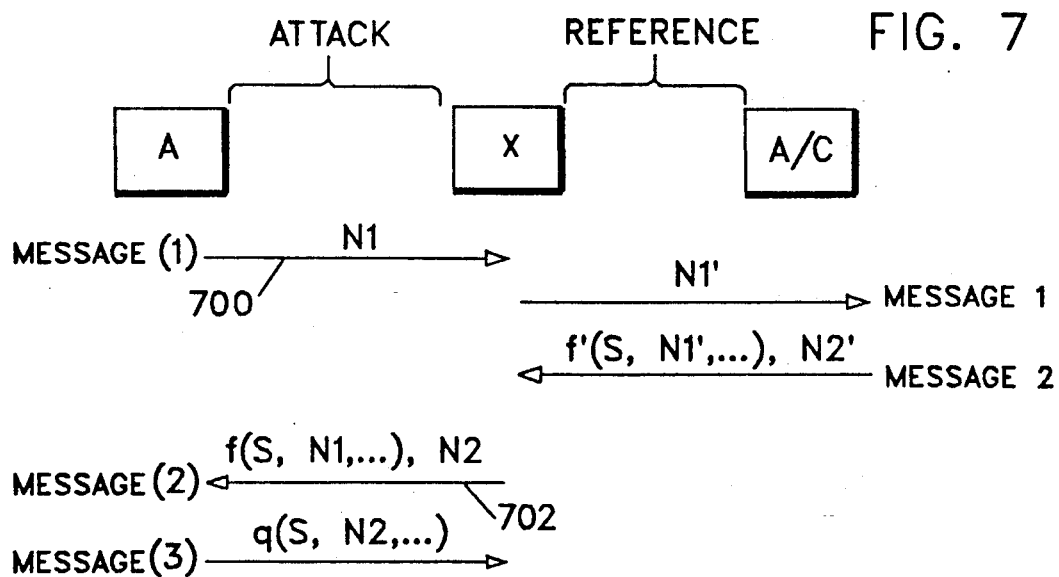
FIG. 7 shows the details of an intercept attack.

There is, however, a second mode of attack that can render even protocols that are secure against initiate attacks also vulnerable. We refer to this mode of attack as intercept attacks. FIG. 7 shows such an attack in terms of an attack connection and a reference connection. In this type of attack, X lies in wait and eventually intercepts an initial challenge from user A destined for another user B. X then initiates a reference connection with a third user. The third user can be A or C. It is worth noting, for analysis purposes, that the reference user can't be the original intended recipient B. Intercept attacks where an intruder merely intercepts messages from A and forwards them on to their intended destination B are equivalent to the intruder X merely watching the data flow by from A to B. These attacks can never be defended against with user authentication protocols. If one is concerned about such attacks because, for example, their data lines can't be physically secured from taps, then one must protect subsequent connection data flow with additional measures, such as data encryption.

With reference to FIG. 7, it is seen that to be successful in the intercept attack connection, X must derive the response to the challenge N1 in message 1 of the attack connection. To attempt to do so, X sends a challenge N1' to a third user A or C as the first message of a reference connection. X receives f'(S, N1', ...) as the response to its challenge and a second challenge N2' in the second message of the reference connection. Thus, X needs to solve the equation $$f(S, N1', \ldots)=f(S, N1, \ldots). \quad \text{Eq. 12}$$

Therefore, a necessary condition C2 that would render a protocol secure against intercept attacks is that X not be able to choose a challenge N1' such that $$f(\ )=f(\ ). \quad \text{Eq. 13}$$

But, mere inspection of equation 13 reveals that this can always be done in the protocol format of FIG. 7. Thus, breaking of the protocol of FIG. 6 is trivial with the use of an intercept attack. All an intruder need do is to pick N1'=N1.

Figure 8:
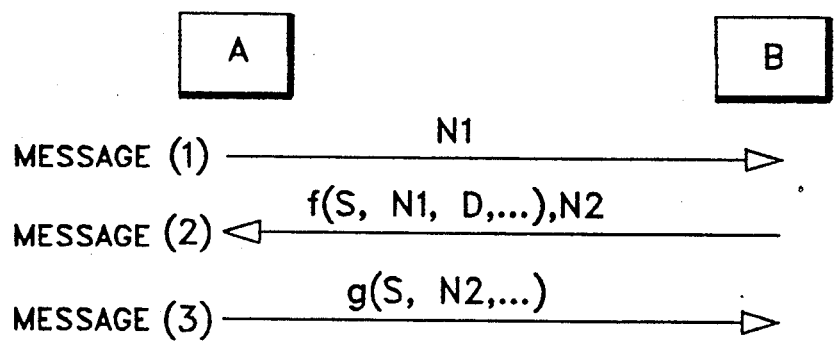
FIG. 8 shows the general form of protocols that are secure against intercept attacks.

To solve this problem, a necessary requirement to prevent the intercept type of attack is that an indicator D be included in f( ) that represents the direction of message flow, as shown in FIG. 8. This is shown as f(S,N1,D, ...) in message 2, where D is the flow direction indicator. It doesn't matter what form D takes, so long as it is unique to a particular direction. For example, D might be equal to the sending users identification, which is B in FIG. 8. Alternatively, if A and B are the users in question, A could use B for its direction indicator and B could use A. All that is required is that on a given connection, the flow indicator be unique for any direction of flow of a message.

It is necessary that D be included in f( ) as demonstrated above. However, it is not sufficient. It is still necessary mathematically to test the condition C2, as will be illustrated.

Figure 9:
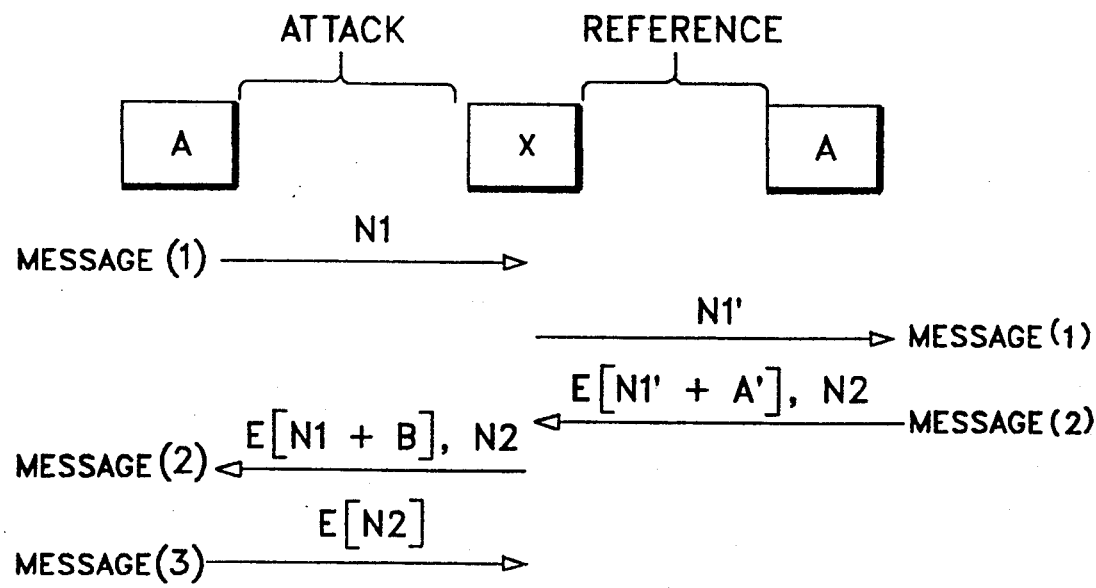
FIG. 9 shows an illustrative protocol that is insecure against both intercept and initiate attacks.

Let's take the example of FIG. 9, in which f( ) is taken to be E[N1+D], D=A for flow from A to B and D=B for flow from B to A. For purposes of analysis, it should be realized that the values of A and B, etc. are known to an intruder X. It is assumed that the intruder X establishes a reference connection with A. Applying condition C2, $$f(\ )=f(\ ), \qquad \text{Eq. 14}$$

$$E[N1'+A']=E[N1+B]. \qquad \text{Eq. 15}$$

It must be realized that the primed notation in A' in equations 14 and 15, and similar notation elsewhere, means only that the variable exists on a reference connection. In other words, A'=A. Equation 15 can't be solved without knowing the encryption key K, because A' and B are different and encoded into the data. By removing the encryption operator E from both sides of the equation, we obtain $$N1'+A'=N1+B, \text{ or} \qquad \text{Eq. 16}$$

$$N1'=N1+B+A'. \qquad \text{Eq. 17}$$

Since X knows both B and A', X need only set N1' in message 1 of the reference connection to N1+B+A', where N1 is obtained from message 1 of the attack connection. X will receive $$E[N1+B+A'+A']=E[N1+B] \qquad \text{Eq. 18}$$

on message 2 of the reference connection. This, of course, is the response needed in message 2 of the attack connection. Thus, this protocol is insecure for intercept types of attacks. As an aside, this protocol is also insecure for initiate attacks. This can be easily verified by testing condition C1 [f( )=g( )] discussed earlier.

Figure 10:
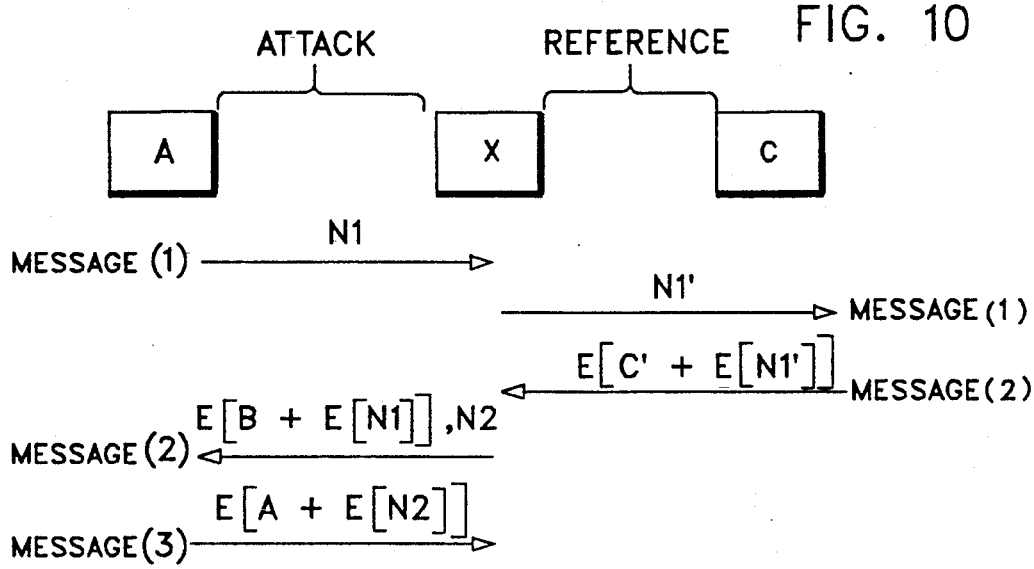
FIGS. 10 and 11 show an illustrative protocol that is secure against intercept attacks, but insecure against initiate attacks.

FIG. 10 shows an example of a protocol that passes condition C2. That is, it is secure from intercept attacks. However, it will be seen that the protocol is insecure against initiate attacks. In this protocol, $$f(\ )=E[D+E[N1]], \text{ and} \qquad \text{Eq. 19}$$

$$g(\ )=E[D+E[N2]], \qquad \text{Eq. 20}$$

where D is the flow direction indicator. Remember that D is different for f( ) and g( ) because the flow direction is different for each of these functions. X intercepts message 1 from user A intended for B. X then initiates a reference connection with C to glean information. Applying condition C2 to FIG. 10, $$f(\ )=f(\ ) \qquad \text{Eq. 21}$$

$$E[C+E[N1']]=E[B+E[N1]], \text{ or} \qquad \text{Eq. 22}$$

$$C+E[N1']=B+E[N1]. \qquad \text{Eq. 23}$$

Equation 23 can be split into two different equations in an attempt to solve it. Thus, $$C'=B, \text{ and} \qquad \text{Eq. 24}$$

$$E[N1']=E[N1]. \qquad \text{Eq. 25}$$

Figure 11:
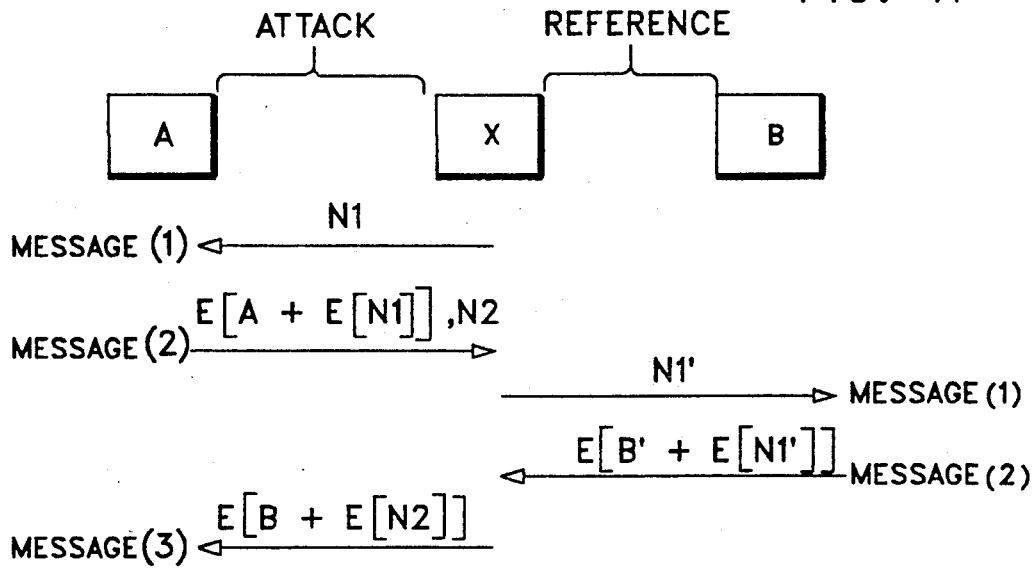

Since it is impossible for C' to equal B, this protocol is secure from intercept attacks. However, the protocol is still insecure against initiate attacks. FIG. 11 shows the initiate attack for this protocol. Remember that X is impersonating B, so the direction indicator in message 3 of the attack connection is B. Applying condition C1:

$$f(\ )=g(\ ) \qquad \text{Eq. 26}$$

$$E[B'+E[N1']]=E[B+E[N2]], \text{ or} \qquad \text{Eq. 27}$$

$$B'+E[N1']=B+E[N2]. \qquad \text{Eq. 28}$$

Splitting equation 28 yields $$B'=B, \text{ (which is always true) and} \qquad \text{Eq. 29}$$

$$E[N1']=E[N2], \text{ or} \qquad \text{Eq. 30}$$

$$N1'=N2. \qquad \text{Eq. 31}$$

Thus, X can successfully initiate an attack against this protocol by merely setting N1' in message 1 of the reference connection equal to N2, which is received from A in message 2 of the attack connection.

Figure 12:
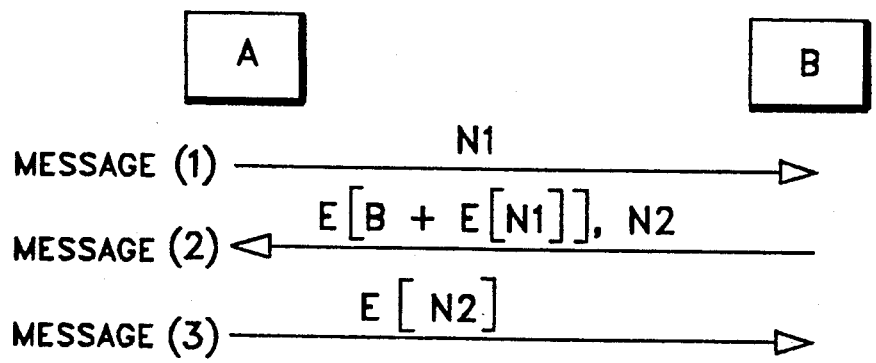
FIG. 12 shows an illustrative protocol that is secure against both initiate and intercept attacks.

FIG. 12 shows a specific protocol that is secure against both initiate and intercept attacks. In this protocol, $$f(\ )=E[B+E[N1]], \text{ and} \qquad \text{Eq. 32}$$

$$g(\ )=E[N2]. \qquad \text{Eq. 33}$$

Notice that the protocol is very similar to that of FIG. 11, which was shown to be insecure against intercept attacks. This illustrates very well the necessity of testing conditions C1 and C2 for any specific protocol, even though the protocol fits the other requirements enumerated. Applying C1 (and assuming that the reference connection is held with A):

$$f(\ )=g(\ ), \qquad \text{Eq. 34}$$

$$E[A'+E[N1']]=E[N2], \qquad \text{Eq. 35}$$

$$A'+E[N1']=N2, \qquad \text{Eq. 36}$$

$$E[N1']=N2+A'. \qquad \text{Eq. 37}$$

Although an intruder X can derive E[N1'] before initiating the reference connection, X still cannot derive N1' for the initial challenge on the reference connection without knowledge of the key K. Therefore C1 is met.

Applying condition C2:

$$f(\ )=f(\ ), \qquad \text{Eq. 38}$$

$$E[A'+E[N1']]=E[B+E[N1]]. \qquad \text{Eq. 39}$$

Removing the E operator from both sides of the last equation and splitting the result into two parts yields $$A' = B \text{ and} \qquad \text{Eq. 40}$$

$$N1' = N1. \qquad \text{Eq. 41}$$

However, A' can never equal B. Thus, C2 is satisfied and the protocol is secure.

The above analyses are sufficient now to allow any skilled art worker to design and analyze families of protocols for complete authentication security. The conditions for complete security against both initiate and intercept attacks may be succinctly stated as follows:

1. The response to a first challenge from A to B must be a secret function of the challenge,
2. The response to a second challenge from B to A must be a secret function of the second challenge,
3. The response to the first challenge from A to B must contain an indication of the direction of flow of the response, and
4. Both conditions C1 and C2 must be met.

Figure 13:
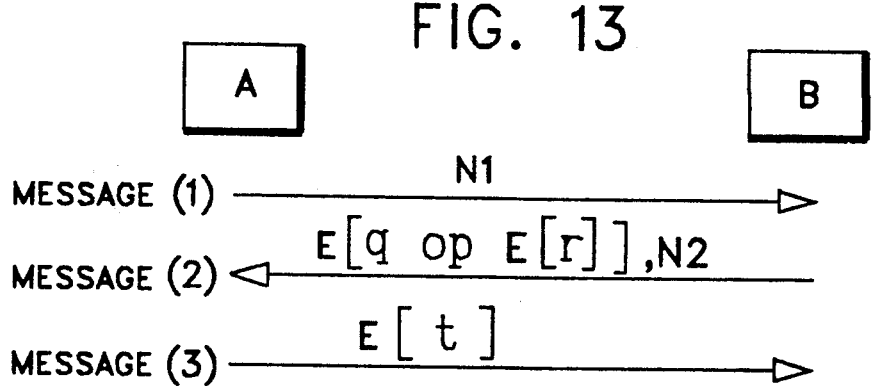
FIG. 13 shows an alternative representation of a general form of protocol in accordance with the invention that is secure from initiate and intercept attacks.

FIG. 13 shows the general format of a family of protocols that fit the four requirements outlined above for security. Some of the specific protocols that fit this general form are secure and some are not. The conditions C1 and C2 must be tested for any specific protocol. The response to the first challenge N1 is of the form $$E[q \text{ op } E[r]].$$

The response to the second challenge N2 is of the form $$E[t].$$

In one family defined by this general form, $$q = q(N1, \ldots), \qquad \text{Eq. 42}$$

$$r = r(D, \ldots), \text{ and} \qquad \text{Eq. 43}$$

$$t = t(N2, \ldots). \qquad \text{Eq. 44}$$

In another family, $$q = q(D, \ldots), \qquad \text{Eq. 45}$$

$$r = r(N1, \ldots), \text{ and} \qquad \text{Eq. 46}$$

$$t = t(N2, \ldots). \qquad \text{Eq. 47}$$

We now examine some illustrative protocols that meet one or the other of these two general formats and further meet conditions C1 and C2.

Using an analysis similar to that used for FIG. 12, it can be shown that the dual of the protocol of FIG. 12, namely, $$f( ) = E[N1 + E[D]] \text{ and} \qquad \text{Eq. 48}$$

$$g( ) = E[N2] \qquad \text{Eq. 49}$$

is also completely secure. The key to these last two protocols and a myriad of related protocols that can be shown to be secure is the encryption of the direction indicator (or first challenge), coupled with the nested encryption of the first challenge (or direction indicator).

Figure 14:
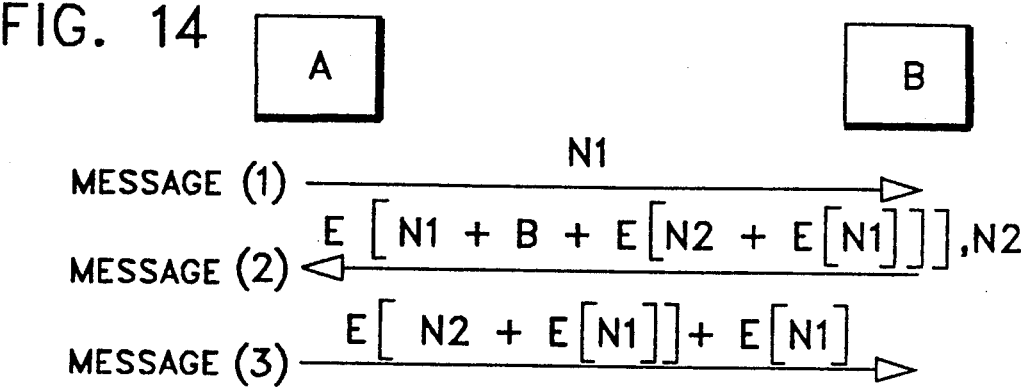
FIGS. 14 through 16 show illustrative specific protocols that are secure and which fit the general forms of FIGS. 13, 8 and 2.

FIG. 14 shows a preferred embodiment of a protocol according to the invention. In this preferred embodiment, $$f( ) = E[j( ) + k( )], \text{ and} \qquad \text{Eq. 50}$$

$$g( ) = k( ) + E[N1], \text{ where} \qquad \text{Eq. 51}$$

$$j( ) = N1 + B, \text{ and} \qquad \text{Eq. 52}$$

$$k( ) = E[N2 + E[N1]]. \qquad \text{Eq. 53}$$

The following gives the rationale for the specific elements of functions f( ) and g( ). The first element N1 of j( ) is not strictly required by the conditions as set forth above. However, this element adds additional randomness to the overall expression f( ). The element can be omitted and the protocol will still work satisfactorily. Adding randomness to f( ) increases the cryptographic strength of the protocol and makes it harder for an intruder to break the encoding algorithm itself using known key breaking techniques.

The inclusion of element B (the name of the called user) in j( ) is required by condition C2 and prevents intercept attacks.

The element N2 in k( ) adds additional randomness to the response to message 2. This element could also be eliminated and the protocol will operate satisfactorily. The element E(N1) in k( ) is required by condition C1. It is essential to have user A's challenge in user B's response. While it is not essential that this element be encrypted, doing so adds additional strength to the protocol.

Figure 16:
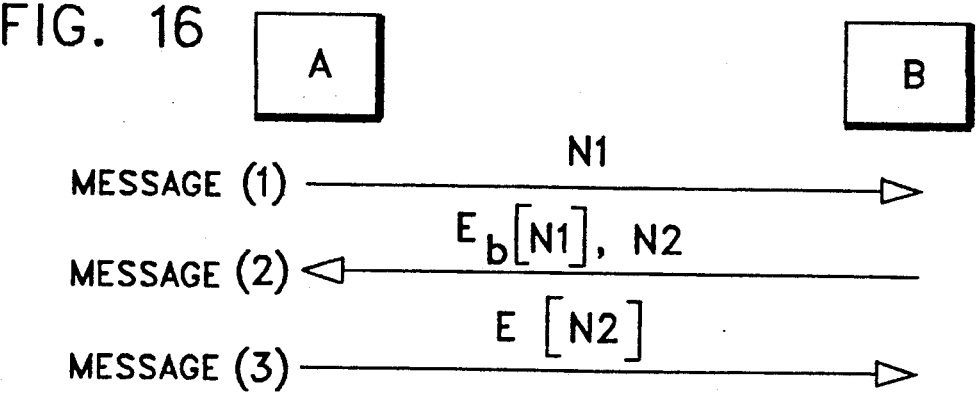

A final example of a family of protocols that meet the general format and the conditions outlined above is now presented. This family incorporates the message flow direction indicator into the secret key that is used for encryption, rather than explicitly incorporating it into the data that is encrypted. One member of the family is illustrated in FIG. 16. Both users A and B know a secret key K. B prepares its response in message 2 to A's challenge N1 by encrypting it with K+B, where B represents B's identity. The '+' operator is again taken as the boolean EXCLUSIVE-OR operation, although it can be any other type of boolean or mathematical operation. A encrypts its response to B's challenge N2 by encrypting it using the unmodified value of K. As required by the invention, B's response to the challenge N1 is a secret function of the challenge N1. Likewise, A's response to the challenge N2 is a secret function of N2. The direction of flow of a message is incorporated into the responses, in a way that both A and B can derive, by use of different encryption keys used to encode the responses. Now let's test the result according to conditions C1 and C2.

C1:

$$f( ) = g( ), \text{ or} \qquad \text{Eq. 54}$$

$$Eb[N1'] = E[N2], \qquad \text{Eq. 55}$$

where E = encryption with secret key K and Eb = encryption with K+B.

Writing of the condition answers itself. There is no way to mathematically cancel out terms to derive the needed N1', because the encryption keys on both sides of the equation are different and unknown to an intruder. One who does not know K cannot solve the equation.

C2:

$$f'(\ )=f(\ ),\text{ or} \quad\quad\quad \text{Eq. 56}$$

$$Eb[N1']=Ea[N1]. \quad\quad\quad \text{Eq. 57}$$

Notice that the right side of the equation is encrypted with key Ea. This represents user A or any other user, except B, that an intruder might go to in a reference connection to glean information. But Ea is different from Eb used to encode the left side of the equation. If the reference connection is with A, then Ka=K+A. Thus, without knowledge of the key K, the equation cannot be solved for N1'. Thus, it is completely secure.

Figure 15:
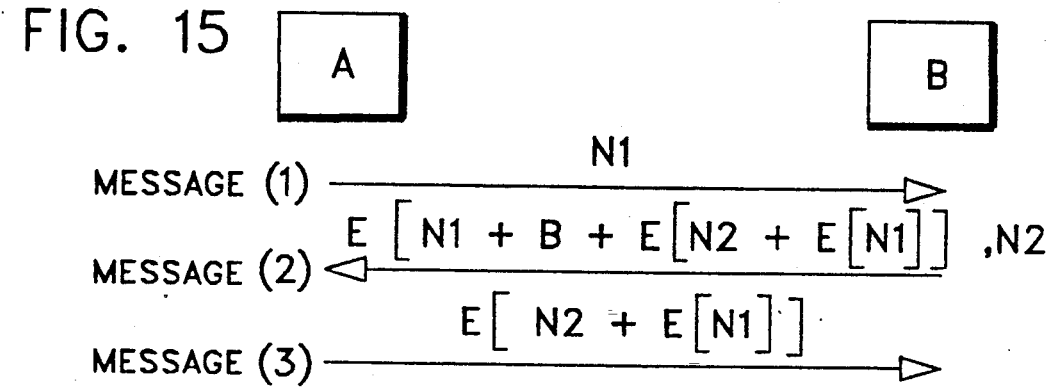
Figure 17:
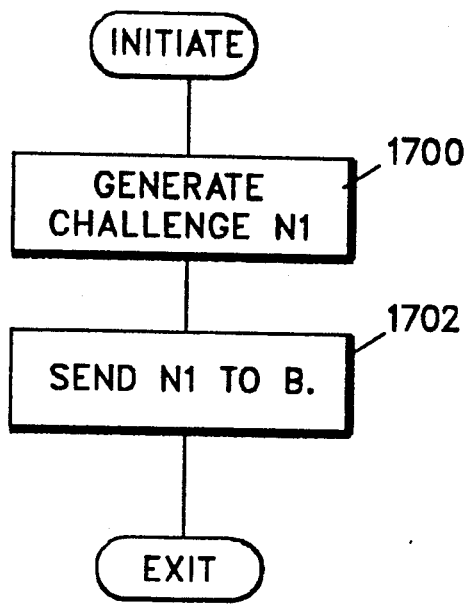
FIGS. 17 through 21 show illustrative flowcharts of programs that can be used in a general or special purpose computer to perform the inventive method.

Illustrative flowcharts of the authentication process are shown in FIGS. 17 through 21. These particular flowchart examples are based on the protocol shown in FIG. 15 and the use of an encryption key (Kab) shared between A and B. Each of these processes in FIGS. 17 through 21 are present at each user and is executed at the appropriate time depending on the particular role of the user, primary (user A) or secondary (user B), and the point within the protocol exchange. FIG. 17 is executed by A attempting to initiate communications with B. Step 1700 generates a nonce N1 as the challenge to B. Step 1702 sends the challenge N1 to B and the process terminates waiting for the arrival of the response to N1 and a new challenge N2.

Figure 18:
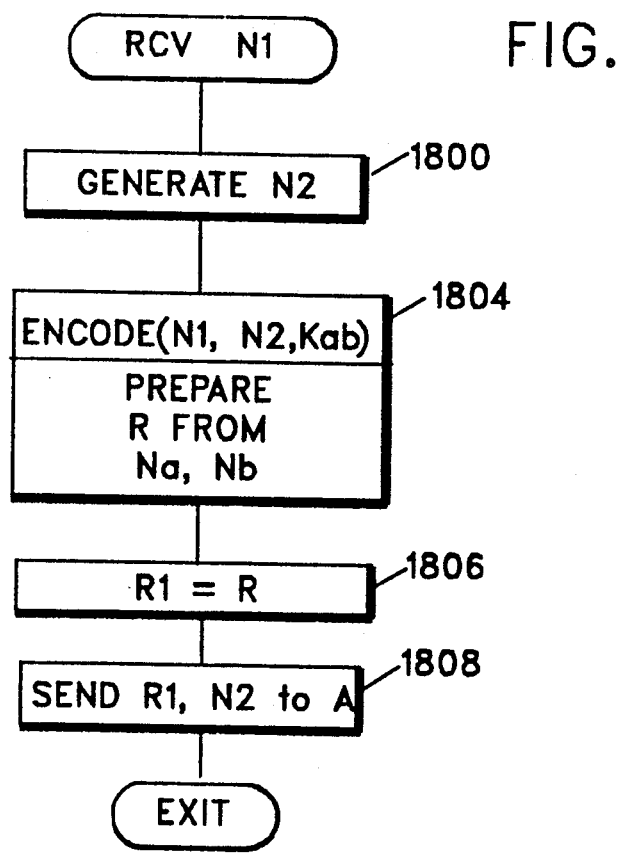
Figure 21:
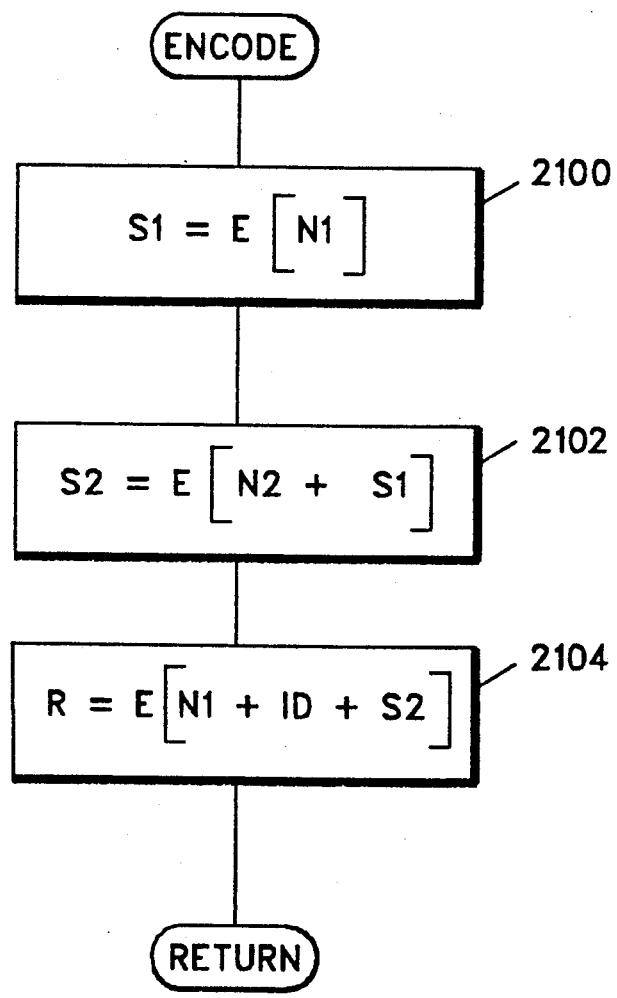

FIG. 18 is executed by B when it receives an initial challenge N1. Step 1800 first generates a challenge N2 to be used as a new challenge to A. Step 1804 executes the subroutine ENCODE, shown in FIG. 21, passing to it the variables N1, N2 and the appropriate key Kab that is shared with user A, to prepare the response to the challenge N1. With reference to FIG. 21, step 2100 of subroutine ENCODE first encrypts the value of N1, using the key Kab and, illustratively, the DES algorithm. The encrypted result is temporarily stored in variable S1. Step 2102 EXCLUSIVE-ORs N2 with S1 and temporarily stores the result in variable S2. Step 2104 EXCLUSIVE-ORs N1 with the identity of this user (B) and then EXCLUSIVE-ORs that result with S2 to obtain an encrypted value R, which is returned to the calling process in FIG. 18. Step 1806 of FIG. 18 assigns the returned encrypted value R to variable R1 and returns R1 along with the new challenge N2 to user A at step 1808.

Figure 19:
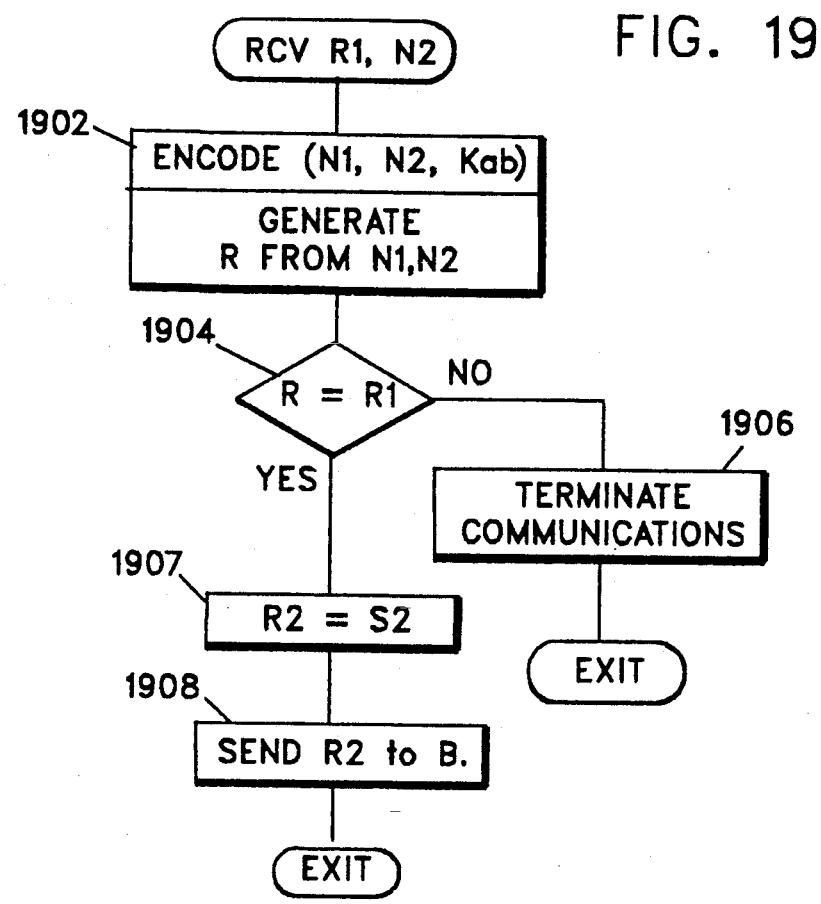

The process in FIG. 19 is executed at A in response to receipt of R1 and challenge N2. N1, N2 and the shared key Kab are then passed to subroutine ENCODE. As discussed above, ENCODE computes the correct response to the initial challenge N1 and returns the answer in variable R. Step 1904 compares the correct response in R to the responses R1 received from user B. If R is not equal to R1, the authentication fails and step 1906 terminates this communication immediately. If R equals R1, however, then B has properly authenticated itself to A.

A must now authenticate itself to B. Step 1907 assigns the value of S2 from the subroutine ENCODE to the response R2 to be sent to B as the third message flow. As shown in FIG. 14, this response is $$E[N2+E[N1]].$$

The value of R2=E[N2+E[N1]] is obtained from the variable S2, without performing another encryption step and is sent to B by step 1908.

Figure 20:
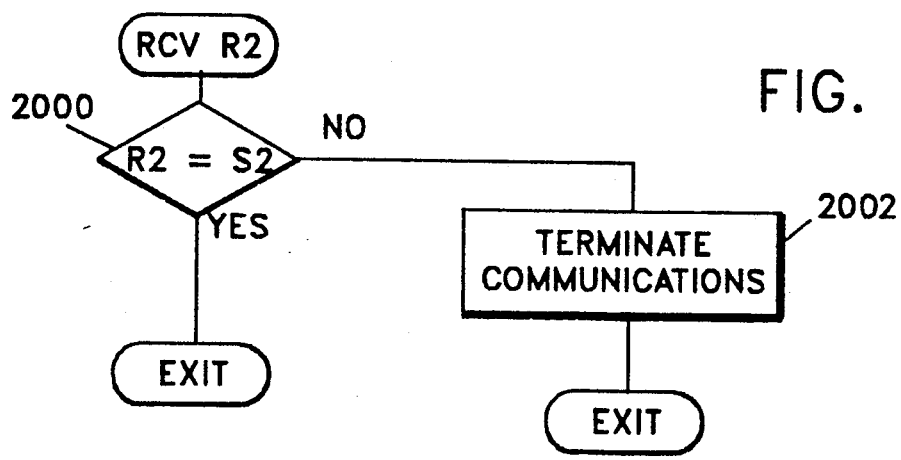

FIG. 20 shows the steps performed by user B when it receives message 3, the response from user A to the challenge N2 from user B. Recall that in this embodiment, this response is of the form g( ), where message 2 is of the form f( )=j( )+g( ). The value of g( )=E[N2 E[N1]] is available in variable S2 at user B, where it was generated earlier by the execution of the steps in FIG. 18. In FIG. 20, step 2000 compares the variable S2 with the response R2 from A. If this comparison does not match exactly, then A has not properly authenticated itself to B. In this case, step 2002 immediately terminates the communication. If the values match, then A is properly authenticated. In this case, the process in FIG. 20 merely exits to allow the users to communicate further.

It is to be understood that the above described arrangements are merely illustrative of the application of principles of the invention and that other arrangements may be devised by workers skilled in the art without departing from the spirit and scope of the invention.

We claim:

1. A method of authenticating a user on a communications connection in a network, comprising the steps of transmitting a first challenge N1 from a first user A to a second user B, transmitting a first response to the first challenge from the second user to the first user, verifying at the first user that the first response is correct, said first response being of the minimum form f(S1, N1, D1 . . . ), wherein S1 is a shared secret between the first and second users, D1 is an indication of the direction of flow of the message containing f( ) and f( ) is a function selected such that $$f'(S1, N1', D1', \ldots )=f(S1, N1, D1, \ldots )$$

cannot be solved for N1' without knowledge of S1, wherein f'( ), N1' and D1' represent expressions on a reference connection.

2. The method of claim 1 wherein the secret S is the mathematical function f( ).

3. The method of claim 2 wherein S1 is a data encryption key.

4. A method of authenticating users on a communications connection in a network, comprising the steps of transmitting a first challenge N1 from a first user A to a second user B, transmitting a first response to the first challenge and second challenge N2 from the second user to the first user, verifying at the first user that the first response is correct, transmitting a second response to the second challenge from the first user to the second user, and verifying at the second user that the second response is correct, said first response being of the minimum form f(S1, N1, . . . ), and said second response being of the minimum form g(S2, N2, . . . ), where S1 and S2 are shared secrets between the first and second users and f( ) and g( ) are functions selected such that $$f(S1, N1', \ldots) = g(S2, N2)$$

cannot be solved for N1' without knowledge of S1 and S2, wherein f'( ) and N1' represent expressions on a reference connection.

5. The method of claim 4 wherein the secret S1 is the mathematical function f( ) and S2 is the mathematical function g( ).

6. The method of claim 4 wherein S1 = S2 = S.

7. The method of claim 6 wherein S is a data encryption key.

8. The method of claim 4 wherein f( ) further includes an indication of the direction D1 of flow of the message containing f( ), as in $$f(S1, N1, D1, \ldots)$$

and f( ) is selected such that $$f(S, N1', D1', \ldots) = f(S, N2, D1, \ldots)$$

cannot be solved for N1' without knowledge of S1 and S2, wherein D1' is the flow direction indicator of the message containing f'( ) on the reference connection.

9. The method of claim 8 wherein $$f( ) = E[q \text{ op } E[r]], \text{ and}$$

$$g( ) = E[t].$$

wherein
op is a mathematical or boolean operation,
q = q(N1, ... ),
r = r(D1, ... ),
t = t(N2, ... ),
E = data encryption with an encryption key.

10. The method of claim 8 wherein $$f( ) = E[q \text{ op } E[r]], \text{ and}$$

$$g( ) = E[t].$$

wherein
op is a mathematical or boolean operation,
q = q(D1, ... ),
r = r(N1, ... ),
t = t(N2, ... ),
E = data encryption with an encryption key.

11. The method of claim 10 wherein $$f( ) = E[D1 \text{ op } E[N1]] \text{ and}$$

$$g( ) = E[N2].$$

12. The method of claim 10 wherein $$f( ) = E[N1 \text{ op } E[D1]] \text{ and}$$

$$g( ) = E[N2].$$

13. The method of claim 10 wherein $$f( ) = E[N1 \text{ op } D1 \text{ op } E[N2 \text{ op } E[N1]] \text{ and}$$

$$g( ) = E[N2 \text{ op } E[N1]] \text{ op } E[N1].$$

14. The method of claim 10 wherein $$f( ) = E[N1 \text{ op } D1 \text{ op } E[N2 \text{ op } E[N1]] \text{ and}$$

$$g( ) = E[N2 \text{ op } E[N1]].$$

15. The method of claim 10 wherein $$f( ) = Eb[N1] \text{ and}$$

$$g( ) = E[N2],$$

where Eb = encryption with data encryption key K op D1.

16. An arrangement at a network node for authenticating a network user, comprising
means for transmitting a challenge N1 to a user,
means for receiving a response to the challenge from the user, and
means for verifying the response,
said response being of the minimum form f(S1, N1, D1 ... ), wherein S1 is a shared secret between the first and second users, D1 is an indication of the direction of flow of the message containing f( ) and f( ) is a function selected such that $$f(S1, N1', D1', \ldots) = f(S1, N1, D1, \ldots)$$

cannot be solved for N1' without knowledge of S1, wherein f'( ), N1' and D1' represent expressions on a reference connection.

17. An arrangement at a network node for authenticating network users, comprising
means for transmitting a first challenge N1 to a user,
means for receiving a first response to the first challenge and a second challenge N2 from the user,
means for verifying the first response,
means for transmitting a second response to the second challenge, and
means for verifying a second response,
said first response being of the minimum form f(S1, N1, ... ), and said second response being of the minimum form g(S2, N2, ... ), where S1 and S2 are shared secrets between authorized users and f( ) and g( ) are functions selected such that $$f(S1, N1', \ldots) = g(S2, N2)$$

cannot be solved for N1' without knowledge of S1 and S2, wherein f'( ) and N1' represent expressions on a reference connection.

18. The arrangement of claim 17 wherein the secret S1 is the mathematical function f( ) and S2 is the mathematical function g( ).

19. The arrangement of claim 17 wherein S1 = S2 = S.

20. The arrangement of claim 19 wherein S is a data encryption key.

21. The arrangement of claim 18 wherein f( ) further includes an indication of the direction D1 of flow of the message containing f( ), as in $$f(S1, N1, D1, \ldots)$$

and f( ) is selected such that $$f(S, N1', D1', \ldots) = f(S, N2, D1, \ldots)$$

cannot be solved for N1' without knowledge of S1 and S2, wherein f'( ) indicates the reference connection and D1' is the flow direction indicator of the message containing f'( ) on the reference connection.

22. The arrangement of claim 21 wherein $$f(\ ) = E[q \text{ op } E[r]], \text{ and}$$

$$g(\ ) = E[t],$$

wherein
op is a mathematical or boolean operation,
$q = q(N1, \ldots)$,
$r = r(D1, \ldots)$,
$t = t(N2, \ldots)$,
E = data encryption with an encryption key.

23. The arrangement of claim 21 wherein $$f(\ ) = E[q \text{ op } E[r]], \text{ and}$$

$$g(\ ) = E[t],$$

wherein
op is a mathematical or boolean operation,
$q = q(D1, \ldots)$,
$r = r(N1, \ldots)$,
$t = t(N2, \ldots)$,
E = data encryption with an encryption key.

24. The arrangement of claim 23 wherein $$f(\ ) = E[D1 \text{ op } E[N1]] \text{ and}$$

$$g(\ ) = E[N2].$$

25. The arrangement of claim 23 wherein $$f(\ ) = E[N1 \text{ op } E[D1]] \text{ and}$$

$$g(\ ) = E[N2].$$

26. The arrangement of claim 23 wherein $$f(\ ) = E[N1 \text{ op } D1 \text{ op } E[N2 \text{ op } E[N1]] \text{ and}$$

$$g(\ ) = E[N2 \text{ op } E[N1]] \text{ op } E[N1].$$

27. The arrangement of claim 23 wherein $$f(\ ) = E[N1 \text{ op } D1 \text{ op } E[N2 \text{ op } E[N1]] \text{ and}$$

$$g(\ ) = E[N2 \text{ op } E[N1]].$$

28. The arrangement of claim 23 wherein $$f(\ ) = Eb[N1] \text{ and}$$

$$g(\ ) = E[N2],$$

where Eb = encryption with data encryption key K op D1.

* * * * *